Feb. 7, 1950
R. W. STALEY
METHOD OF CURING CEMENT-TYPE
COLD MOLDING COMPOSITIONS
Filed Nov. 8, 1946
2,496,895
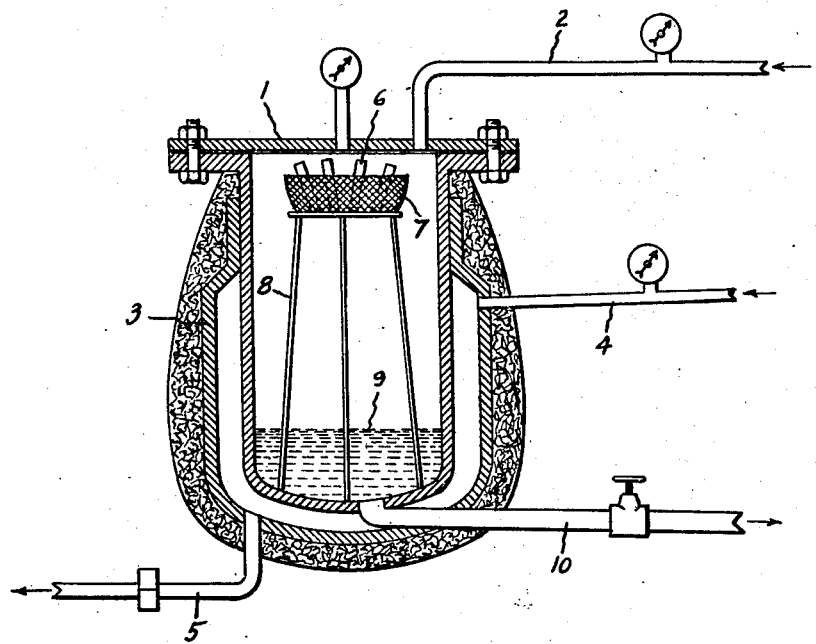
Inventor:
Ronald W. Staley,
by
His Attorney.

Patented Feb. 7, 1950

2,496,895

UNITED STATES PATENT OFFICE 2,496,895

METHOD OF CURING CEMENT-TYPE COLD MOLDING COMPOSITIONS

Ronald W. Staley, Pittsfield, Mass., assignor to General Electric Company, a corporation of New York Application November 8, 1946, Serial No. 708,742

6 Claims. (Cl. 18—47.5)

This invention is concerned with new cementitious (refractory) compositions of matter and methods of making the same. More particularly, this invention relates to a method of curing a shaped article comprising a mixture of ingredients containing a Portland cement and a substantially non-acidic filler, which method comprises concurrently subjecting the said article, under pressure, to an atmosphere comprising from approximately 80 to 20 mol per cent carbon dioxide (in the gaseous state) and conversely from approximately 20 to 80 mol per cent substantially dry steam.

In the field of cold-molded compositions of matter comprising substantially inorganic materials, shaped articles prepared from a mixture of materials comprising ground Portland cement binder and an inorganic filler (usually in the form of fibers or also finely ground) have assumed a position of great importance. Such types of materials are especially suited for the manufacture of arc chutes, circuit breakers, and for other articles of manufacture where non-inflammability is of the utmost importance. In addition, cold-molded articles, because of the ease with which they can be adapted to mass production techniques, are employed for such articles of manufacture as knobs, switch bases, terminal insulators, control panels, etc.

Present day techniques for making cold molded products comprise mixing the cementitious binder with an inorganic filler, molding the article to shape for a very short time, e. g., for about 5 seconds, in a cold mold or in a mold which has been heated somewhat, and thereafter removing the molded article from the mold and subjecting it to an atmosphere which sets the cement or, as it is often called, cures the cement. Various methods have been employed to effect the curing of the cement. Several of these methods comprise treating the cold-molded article with, e. g., steam, or carbon dioxide, or first with a water fog and thereafter immersing the articles in water for varying lengths of time. By means of these treatments the cement is cured to an appreciable extent and fair strengths result. However, such treatments leave much to be desired. For instance, when the steam treatment alone is employed to cure the shaped article, it is believed by many authorities that the Portland cement is changed from the tricalcium silicate form to the dicalcium silicate form in accordance with the following equation:

$$3CaO.SiO_2 \xrightarrow{steam} 2CaO.SiO_2 + Ca(OH)_2$$

In this case, when no acidic material is present to react with the free lime formed, the lime apparently disrupts the structure, causing poor strength. It is therefore essential to incorporate a substantial amount of an acidic filler, e. g., silica, to react with the lime. However, the use 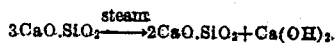 of silica has the disadvantage that it occupies space ordinarily taken up by fibrous fillers which reinforce the article. This results in a loss in strength nearly compensating for the gain obtained in using the silica. Thus, the advantage obtained by using substantially non-acidic fillers, e. g., asbestos floats, short or long asbestos fibers, etc., which ordinarily add greatly to the strength of the cold-molded article, is nullified.

When carbon dioxide (gaseous carbon dioxide) alone is employed to treat the cold-molded Portland cement product, the $Ca(OH)_2$ present in the cement reacts with the carbon dioxide to form insoluble $CaCO_3$. However, it is difficult to obtain sufficient saturation of the Portland cement with the carbon dioxide to convert all the $Ca(OH)_2$ to the more desirable insoluble $CaCO_3$. If water is depended upon to form aqueous carbonic acid with the carbon dioxide, the aqueous carbonic acid in the presence of an excess of carbonic acid gas forms with hydrated lime, acidic calcium bicarbonate, the acidic bicarbonate decomposing into an insoluble carbonate. However, this process predicates its success on an abundance of moisture, and in view of the fact that carbon dioxide has a limited solubility in even cold water, and decreases as the temperature increases, the conversion of the lime under such conditions is incomplete. This difficulty is also present in the usual process of curing cement compositions of matter with high pressure wet steam and carbon dioxide, that is, the carbonation is confined to the outer surface of the object being treated and does not penetrate into the interior, thus resulting in an inferior product of poor strength.

I have now discovered that shaped compositions of matter comprising Portland cement as a binder and containing a substantially non-acidic filler can be treated concurrently with both carbon dioxide and substantially dry steam to yield articles having strengths heretofore unobtainable by the methods now known to the art. It was surprising to discover that the concurrent dry steam and carbon dioxide cycle could accomplish this because of the aforementioned limited solubility of carbon dioxide in even moderately warm water.

In the practice of my invention, the concurrent use of the dry steam and carbon dioxide (gaseous carbon dioxide) can be utilized to its fullest extent only if certain conditions are rigidly enforced. One of the conditions consists in effecting contact between the shaped article and the treating medium while the whole system is under pressure. In addition, the steam employed should be substantially dry steam. This, of course, necessitates treating the shaped articles at temperatures of at least above about 100° C. Furthermore, to obtain the desired results, it is essential that the carbon dioxide and dry steam be present within certain proportions, namely, from approximately 80 to 20 mol per cent carbon dioxide and conversely from approximately 20 to 80 mol per cent substantially dry steam. Optimum results are usually obtained when the two gases are employed within limits ranging from approximately 60 to 40 mol per cent carbon dioxide and conversely from approximately 40 to 60 mol per cent substantially dry steam.

To derive the optimum benefits from my invention, it is essential that a substantially non-acidic filler be employed with the Portland cement binder. However, small amounts of slightly acidic fillers may be incorporated with the substantially non-acidic filler in amounts corresponding, by weight, from about 0 to 15 per cent of the weight of the substantially non-acidic filler, or 0 to 10 per cent of the weight of the total ingredients. Examples of acidic fillers which may be used with the non-acidic fillers in these proportions are silica ($SiO_2$), slate, diatomaceous earth, etc. It is not exactly understood why outstanding results are obtained using a substantially non-acidic filler. However, it is believed that the use of an acidic filler results in the acidic filler competing with the carbon dioxide for the $Ca(OH)_2$ freed in the process, with the result that there is less $CO_2$ taken up and therefore less $CaCO_3$ formed to fill the voids and reinforce the structure. In such a case, after the cure treatment, much less $CO_2$ has been found to be incorporated into the structure than if the filler consisted substantially of non-acidic material.

The proportion of Portland cement to the substantially non-acidic filler may be varied over a wide range. Good results are obtained when, by weight, the Portland cement comprises from about 25 to 95 per cent, preferably from 35 to 65 per cent, of the mixture comprising Portland cement and the substantially non-acidic filler. Substantially non-acidic fillers which may be employed with the Portland cement are, e. g., asbestos, for instance, asbestos floats, short asbestos fibers, long asbestos fibers, etc., granular fillers, e. g., mica, olivine, dolomite, magnesite, feldspar, talc, etc. The amount, by weight, of the non-acidic filler present may range from about 5 to 75 per cent, preferably from 35 to 65 per cent, of the total weight of the non-acidic filler and the Portland cement, the total per cent of the ingredients, including the filler and Portland cement, being equal to substantially 100 per cent. Small amounts of calcium hydroxide may be used advantageously to increase the amount of $CO_2$ reacted with the mass and to further increase the strength properties. A useful range of ingredients which may be employed comprises the following materials in the designated per cents by weight:

| | Per cent |
|---|---|
| Portland cement | 35 to 95 |
| Substantially non-acidic filler e. g., asbestos | 65 to 5 |
| Acidic filler | 0 to 10 |
| Lime (calcium hydroxide) | 0 to 5 |
| Plasticizer, e. g., kaolin clay | 0 to 10 |

The percentage of each component is so chosen that the total is equal to 100 per cent.

Various procedures may be employed to carry out the practice of my invention. One of these comprises moistening the mixture of Portland cement and filler with a sufficient amount of water (for example, 15 to 25 per cent water based on the weight of the solid materials) to form a flowable mixture. Plasticizing clays, for example, kaolin clay, up to the extent of about 10 per cent of the weight of the dry ingredients (Portland cement and filler), may also be incorporated to increase the flow of materials in the mold. The compound is formed in steel molds (cold or heated) under pressure, removed from the molds and thereafter preferably allowed to set in air for varying lengths of time, e. g., from about 2 to 10 hours, or until the initial set has taken place. It is, of course, understood that though the step of allowing the shaped article to set in the air is highly desirable and important, the length of time during which the air-set takes place is not critical. For instance, tests have shown that shaped articles which have been allowed to set in the air for a period of time as long as six months were advantageously treated in accordance with the embodiments of my invention; this indicates that my claimed process of treatment is not dependent upon an optimum water content in the shaped article before the treatment with carbon dioxide and steam.

After the shaped part has set for a sufficient length of time, it may then be placed in an autoclave where it is treated with the carbon dioxide and dry steam mixture. Any apparatus suitable for the purpose may be used in which the shaped article may be subjected to the mixture of gases (carbon dioxide and dry steam). The figure in the accompanying drawing is a diagrammatic view of a suitable apparatus for carrying out the claimed process.

The apparatus shown in the drawing comprises essentially an autoclave, the general structure of which is well known in the art. Carbon dioxide is supplied from a high pressure container through a pressure reducing valve and enters the jacket 3 through the inlet pipe 2. Heating of the autoclave is accomplished e. g., by means of steam which is supplied to the steam jacket at high pressure through a pressure reducing valve and enters the jacket through the inlet pipe 4. The steam return pipe is shown at 5. The shaped (molded) article (or articles) 6 to be cured is placed in a basket 7 which is supported on a tripod 8. The water supply or source 9 for generating steam, i. e., the dry steam which is to be mixed with the incoming carbon dioxide, is located in the bottom of the autoclave 1 and may be drawn off through water outlet pipe 10.

The heating steam should be supplied through the steam jacket at a high enough pressure to produce the required steam pressure on the outside of the autoclave. I have found, for example, that if 40 pounds per square inch autoclave (internal treating atmosphere) steam pressure is desired, about 50 pounds per square inch jacket pressure is usually required. In the operation of the apparatus the steam is introduced into the outer jacket throughout the curing cycle. Excess water is at all times available in the form of a pool at the bottom of the autoclave. However, it is to be understood that despite the presence of the pool, the steam is substantially dry since the temperature of the treating atmosphere is at least 100° C.

It has been found that if temperatures of from about 100° to 150° C. or higher are used, this will preclude the possibility of any water droplets being present above the pool of water in the autoclave treating chamber (for brevity hereinafter referred to as the "autoclave"). This is important for the reason that, since the water and carbon dioxide are in the form of gases, they are in a dynamic state of activity, and capable of greater penetration than if in the form of liquids which may be considered to be in a relatively static state of activation as compared to gases.

The carbon dioxide is supplied to the autoclave at a pressure equal to the total pressure required. I have found, for example, that if a total autoclave pressure of 80 pounds per square inch is desired, the carbon dioxide may be supplied at a pressure of 80 pounds per square inch. Thus, if the steam pressure inside the autoclave is 40 pounds per square inch, then the partial pressure of the carbon dioxide will be about 40 pounds per square inch, because the difference between the total autoclave pressure and the internal pressure of the steam may be assumed to be the partial pressure of the carbon dioxide. For my purposes, I obtain good results when the total autoclave pressure (internal) ranges from about 50 to 175 pounds per square inch. It will be understood by those skilled in the art, that the length of time during which the shaped article is subjected to the mixture of carbon dioxide and substantially dry steam may be varied depending on several factors, including, e. g., the size of the shaped article, the number of articles being treated, the pressures employed, etc. Usually the time employed for treating the article will advantageously range from about 6 to as long as 24 or 48 hours. Generally, for each one-quarter inch thickness, the dry steam-carbon dioxide treatment should be carried out for from about 3 to 6 hours.

After treating the shaped article, it is removed and usually baked at elevated temperatures, e. g., 150° to 200° C., to remove any residual moisture which may have condensed on the parts in cooling the autoclave prior to opening it and removing the parts. Although after-baking is not absolutely essential, where increase in strength is the only requirement, it does improve the electrical properties of the articles. The electrical properties of the shaped article may be further improved by impregnating the cured article with various impregnants for that purpose, e. g., substantially water-insoluble impregnants, for instance, paraffin wax, cashew nut shell liquids (especially those comprising a phenol having on its nucleus a 14 to 28 carbon atom unsaturated hydrocarbon substituent whose unsaturation is due solely to one or more ethylenic linkages and particularly with that group of said phenols which includes those liquids derived from the Anacardiaceae family of plants and certain constituents and derivatives thereof, which compositions are a fraction of cashew nut shell liquid sold, e. g., by the Irvington Varnish and Insulator Company of Irvington, New Jersey), heat-convertible synthetic resins, heat polymerizable materials, e. g., styrene, etc., drying oils, cumar resin (paracoumarone-indene resins sold, e. g., by the Barrett Division of the Allied Chemical Company), etc.

In order that those skilled in the art may better understand how the present invention may be practiced, the following examples are given by way of illustration and not by way of limitation. All parts are by weight.

In the following examples, the method of mixing the ingredients comprised moistening the ingredients with about 15 per cent water based on the weight of the dry materials and thereafter mixing them thoroughly in a double-armed dough mixer (Baker-Perkins mixer). The molding compound thus obtained was molded to shape in a steel compression mold for about 5 seconds at normal temperatures under a pressure of about 5000 pounds per square inch. The pieces were allowed to set in the air (for about 15 hours) and thereafter were suspended in an autoclave of the type described in the accompanying drawing and treated with the particular treating medium for the time specified in the examples. After the curing operation, the samples were baked for approximately 15 hours at 170° C. prior to testing.

EXAMPLE 1

A molding composition was prepared comprising the following ingredients:

| Ingredient | Parts |
|---|---|
| Portland cement | 550 |
| Asbestos floats (short fibers) | 240 |
| Medium long Canadian chrysotile asbestos fibers | 120 |
| Kaolin clay (used for plasticizing purposes) | 90 |
| Water | 150 |

The above molding composition was molded into the form of bars (0.5" x 0.5" x 5") and disks (4" in diameter by 0.25" thick). The bars and disks were treated in the previously described autoclave at the pressures specified below. Unless stated otherwise, the length of treatment was for about 8 hours and the air set, i. e., the length of time during which the molded pieces were allowed to set in the air after the molding operation prior to the treatment in the autoclave, was approximately 15 hours. As a control, some of the disks and bars were subjected to the usual commercial treatment given cold-molded articles of this type. This consisted in subjecting the air-set pieces to a moist (fog) atmosphere for 24 hours and then immersing the pieces in water for another 24 hours; this was followed by a bake for about 20 hours at approximately 175° C.

| Sample No. | Type Cure | $CO_2$-Dry Steam Ratio, Lbs./in.$^2$ | Per Cent Weight Increase | Charpy Impact Ft. lbs. | Flexural Lbs./in.$^2$ |
|---|---|---|---|---|---|
| 1 | Fog and water (Control) | | | 0.27 | 4,800 |
| 2 | $CO_2$-Steam | 75-5 | 5.8 | 0.28 | 4,500 |
| 3 | do | 60-20 | 10.9 | 0.28 | 5,770 |
| 4 | do | 40-40 | 8.1 | 0.34 | 7,410 |
| 5 | do | 20-60 | 4.7 | 0.32 | 7,160 |
| 6 | do | 0-80 | 0.3 | 0.25 | 4,740 |
| 7 | do | 75-75 | | 0.35 | 7,080 |
| 8 | Fog and Water [a] | 50 lbs./in.$^2$ $CO_2$ | 5.3 | 0.27 | 4,860 |
| 9 | do [a] | 75-75 | 7.8 | 0.28 | 8,270 |
| 10 | $CO_2$-Steam [b] | 75-75 | | 0.36 | 7,530 |

[a] In Samples 8 and 9, cured and baked specimens of Sample 1 were subjected to a carbon dioxide pressure of 50 p. s. i. for 24 hours in the autoclave (in the case of Sample 8), and to a carbon dioxide-dry steam treatment at 150 p. s. i. total pressure for 24 hours in the autoclave (in the case of Sample 9). All the treated specimens were baked at 150° C. for 15 hours and then tested with the above results.

[b] In Sample 10, the carbon dioxide-steam treatment was continued for 24 hours at the designated pressure instead of the 8 hours used for Samples 2-7.

[c] Per cent weight increase over the weight of Sample 1.

Several other tests, namely, water absorption (24 hours), dielectric strength and insulation resistance tests, were conducted on Samples 1 and 4 with the following results:

| Sample No. | Water Absorption 24 hours | Dielectric Strength 25° C. in Oil | Insulation Resistance |
|---|---|---|---|
| | Per Cent | Volts/Mil | |
| 1 | 10.0 | 16 | 85 |
| 4 | 6.5 | 22 | 110 |

Three disks of each set obtained from Samples 1 and 7 were immersed in a high melting point paraffin wax, cumar CX resin (manufactured by Barrett Division of Allied Chemical and Dye Corp.) and Cardanol No. 923 (manufactured by Irvington Varnish and Insulator Co., obtained from cashew nut shell liquid and comprising essentially the phenol having the formula $C_{20}H_{32}O$, and commonly known as Cardanol) at 130° C. for about 15 hours. The disks were rinsed in xylene to remove the excess impregnant from the surface. The disks impregnated with Cardanol 923 were baked at 150° C. for 15 hours. All the disks were tested for insulation resistance before and after 24 hours' immersion in water, 4 hours later, 24 hours later, and 48 hours later. The method of testing was according to test method No. D257-38 as specified by the American Society for Testing Materials. Following are the results of the various tests:

*Description of disks*

| Sample No. | Type Cure | Impregnant | Per Cent By Weight Impregnant Absorbed |
|---|---|---|---|
| 1A | Fog and water | Paraffin | 6.3 |
| 1B | do | Cumar resin | 6.5 |
| 1C | do | Cardanol | 9.0 |
| 7A | $CO_2$-Steam | Paraffin | 3.6 |
| 7B | do | Cumar resin | 1.5 |
| 7C | do | Cardanol | 3.2 |

*Insulation resistance in megohms*

| Sample No. | As Received | After 24 Hours in Water | 4 Hours Later | 24 Hours Later | 48 Hours Later |
|---|---|---|---|---|---|
| 1A | 113,000 | 47 | 165 | 452 | 520 |
| 7A | 100,000 | 102 | 1,200 | 4,300 | 5,950 |
| 1B | 92,000 | 27 | 51 | 144 | 131 |
| 7B | 125,000 | 29 | 123 | 230 | 256 |
| 1C | 86,000 | 62 | 556 | 1,190 | 1,630 |
| 7C | 105,000 | 13,200 | 22,000 | 35,000 | 35,000 |

The above electrical insulation resistance results demonstrate conclusively the advantage obtained by impregnating cementitious cold-molded articles which have been previously treated in accordance with the embodiments of my invention. More particularly, the treatment with the carbon dioxide-dry steam mixture improves considerably the ability of the impregnated article to recover its electrical resistance after water immersion. The Cardanol-impregnated samples retained relatively high electrical resistance with a high rate of recovery after water immersion. It will of course be understood by those skilled in the art, that other impregnants including other resinous impregnating agents or impregnants in addition to the ones employed in the foregoing example, may be used to advantage to improve the electrical properties of the cold-molded parts treated with my claimed dry steam-carbon dioxide process.

EXAMPLE 2

A molding composition was prepared in the same manner as in Example 1. This composition had the following formulation:

| Ingredient | Parts |
|---|---|
| Portland-Puzzolan Cement [1] | 500 |
| Asbestos floats (short fibers) | 275 |
| Medium long Canadian chrysotile asbestos fibers | 125 |
| Kaolin clay | 100 |
| Water | 150 |

[1] This cement has the approximate formula of $2CaO-SiO_2$ and is manufactured by the Eddystone Portland Cement Company.

This molding composition was molded into bars and treated with a mixture of dry steam and carbon dioxide and baked in the same manner as was done in Example 1 for Sample No. 7 (75 p. s. i. carbon dioxide-75 p. s. i. dry steam). Several of the bars were treated and baked in the same fashion as was done for the specimens in Sample No. 1. The following strength results were obtained on these samples.

| Sample No. | Type Cure | Charpy Impact, Ft. Lbs. | Flexural, Lbs./in.² |
|---|---|---|---|
| 11 | Fog and water | 0.28 | 4,420 |
| 12 | $CO_2$-Dry steam | 0.32 | 6,170 |

EXAMPLE 3

Molding compositions were prepared in the manner shown in Example 1. The formulations of these molding compositions were as follows:

| Ingredient | Sample 13 | Sample 14 | Sample 15 |
|---|---|---|---|
| | Parts | Parts | Parts |
| Portland Cement | 1,000 | 500 | 500 |
| Silex (silica or $SiO_2$) | | 500 | |
| Talc | | | 500 |
| Water | 100 | 100 | 115 |

Bars were molded from the above molding compositions and specimen bars were cured using fog and water as in Sample 1 of Example 1, and using a carbon dioxide-dry steam treating medium (75 p. s. i. dry steam and 75 p. s. i. carbon dioxide) as employed for Sample 7 in Example 1. The bars were after-baked for 20 hours at 150° C., and tested for their strength characteristics with the following results:

| Sample No. | Type Cure | Per Cent Weight Increase Over Fog-Water Cure | Charpy Impact, Ft. Lbs. | Flexural, Lbs./in.² |
|---|---|---|---|---|
| 13A | Fog and water | | 0.17 | 2,380 |
| 13B | $CO_2$-Dry Steam | 5.1 | 0.21 | 3,480 |
| 14A | Fog and Water | | 0.14 | 2,070 |
| 14B | $CO_2$-Dry Steam | 9.6 | 0.17 | 2,560 |
| 15A | Fog and Water | | 0.16 | 1,900 |
| 15B | $CO_2$-Dry Steam | 20.2 | 0.22 | 3,870 |

The results of tests conducted on the samples in this example demonstrate the effect of using an acidic filler such as silica. Under the conditions of treatment, the sand or silica functions as an acidic material and competes with the carbon dioxide for the lime liberated by the cement as a result of the dry steam treatment thereof. When this competition is successful in part, a corresponding reduction in the carbon dioxide take-up results. This is reflected in the large increase in weight of the sample containing talc (substantially non-acidic filler) as the filler as compared to the sample containing the silex (silica) as the filler.

EXAMPLE 4

In the following example, various molding compositions were prepared using small amounts of lime (calcium hydroxide) in the formulation and thereafter the molding compositions were treated in accordance with my claimed process. As a control, two of the compositions contained no lime. One of the latter compositions was treated with fog and water and the others with dry steam and carbon dioxide. The compositions comprised the following ingredients:

| Ingredient | Sample 16 | Sample 17 | Sample 18 | Sample 19 |
|---|---|---|---|---|
| | Parts | Parts | Parts | Parts |
| Portland cement | 550 | 550 | 550 | 540 |
| Asbestos floats (short fibers) | 240 | 240 | 240 | 230 |
| Medium long Canadian chrysotile asbestos fibers | 120 | 120 | 120 | 110 |
| Kaolin clay | 80 | 80 | 30 | |
| Slaked lime | | | 50 | 100 |
| Water | 150 | 150 | 150 | 150 |

The above mixtures were each molded into the form of bars as was done in Example 1. All the bars (with the exception of the bars prepared in Sample 16) were treated in an autoclave at the pressures specified below after allowing all the pieces to set in the air for about 15 hours. Sample 16 was treated in a manner similar to Sample 1 in Example 1 and Samples 17, 18, and 19 were treated for 8 hours in the autoclave at the pressures stated below. Following are the results of tests conducted on the molded pieces which were treated according to the stipulated conditions:

| Sample No. | Type Cure | $CO_2$-Dry Steam Ratio, Lbs./in.² | Charpy Impact, Ft. Lbs. | Flexural, Lbs./in.² |
|---|---|---|---|---|
| 16 | Fog and water (control) | | 0.27 | 4,280 |
| 17 | $CO_2$-Steam | 75-75 | 0.33 | 6,710 |
| 18 | do | 75-75 | 0.34 | 7,290 |
| 19 | do | 75-75 | 0.30 | 5,531 |

From the foregoing results, it will be apparent that by means of my process of treating a shaped article comprising Portland cement and a non-acidic filler, I am able to obtain articles which possess strength substantially greater than those obtainable by the usual methods heretofore employed in the art. Such results are obtainable only if a substantially non-acidic filler is employed and the treating conditions are confined to a medium consisting of dry steam and carbon dioxide, the latter two gases being present within specific ranges, namely, from approximately 80 to 20 mol per cent substantially dry steam. Optimum results are obtained when the carbon dioxide and the substantially dry steam are present in about equal mol per cents, e. g., the partial pressure of each gas is the same and wherein the total pressure of the two gases is from about 80 to 150 pounds per square inch.

I believe the products obtained by my process are substantially different from the products obtained by any method heretofore employed. This fact is evidenced by the improvements in properties which I am able to effect by the practice of my invention. This difference is believed to be due to the substantial lack of residual or free calcium hydroxide molecules in the finally treated product. By means of my claimed process, I am able to effect conversion of substantially all calcium hydroxide molecules to the more desirable calcium carbonate form. This conversion is reflected in the increase of specific gravity of the cold-molded product which increases, e. g., from about 2.00 to 2.25. This increase in specific gravity is not accompanied by any measurable increase in size of the article, indicating that my claimed process of treating cold-molded articles actually results in a decrease of the size of the voids present by the filling in of the said voids with calcium carbonate.

What I claim as new and desire to secure by Letters Patent of the United States is:

1. The method which comprises (1) shaping a mixture of ingredients comprising a Portland cement and a substantially non-acidic filler, and (2) concurrently subjecting the shaped article, under pressure at a temperature of at least 100° C., to an atmosphere comprising from approximately 80 to 20 mol per cent carbon dioxide and conversely from approximately 20 to 80 mol per cent substantially dry steam.

2. The method which comprises (1) forming into a definite shape a mixture of ingredients comprising Portland cement and a substantially non-acidic filler, (2) allowing the formed article to partially set, and (3) concurrently subjecting the said article under pressure at a temperature of at least 100° C. to an atmosphere comprising from approximately 80 to 20 mol per cent carbon dioxide and conversely from approximately 20 to 80 mol per cent substantially dry steam.

3. The method of curing a shaped article comprising a mixture of ingredients containing Portland cement and asbestos, which method comprises concurrently subjecting the said article, under pressure at a temperature of at least 100° C., to an atmosphere comprising from approximately 60 to 40 per cent carbon dioxide and conversely from approximately 40 to 60 mol per cent substantially dry steam.

4. The method of curing a shaped article comprising a mixture of ingredients containing Portland cement, asbestos, and a plasticizer for the said mixture, which method comprises concurrently subjecting the said article, under pressure and at a temperature of from 100° to 150° C., to an atmosphere comprising from approximately 60 to 40 mol per cent carbon dioxide and conversely from approximately 40 to 60 mol per cent substantially dry steam.

5. The method of curing a shaped article comprising a mixture of ingredients containing, by weight, from 35 to 65 parts Portland cement and from 65 to 35 parts asbestos, which method comprises concurrently subjecting the said article, under pressure at a temperature of from 100° to 150° C., to an atmosphere comprising carbon dioxide and substantially dry steam, said atmosphere comprising from approximately 60 to 40 mol per cent carbon dioxide and conversely from approximately 40 to 60 mol per cent substantially dry steam.

6. The process of making a shaped article having good electrical insulation resistance and comprising a homogeneous mixture containing the following ingredients in the specified percentages by weight:

| | Per cent |
|---|---|
| Portland cement | 35 to 95 |
| Substantially non-acidic filler | 65 to 5 |
| Acidic filler | 0 to 10 |
| Lime | 0 to 5 |
| Kaolin clay | 0 to 10 | the sum of the ingredients being equal to about 100 per cent, which method comprises (1) concurrently subjecting the said shaped article, under pressure at a temperature of at least 100° C., to an atmosphere comprising from approximately 80 to 20 mol per cent carbon dioxide and conversely from approximately 20 to 80 mol per cent substantially dry steam and (2) thereafter impregnating the shaped article with a cashew nut shell liquid comprising essentially Cardanol.

RONALD W. STALEY.

REFERENCES CITED

The following references are of record in the file of this patent:

UNITED STATES PATENTS

| Number | Name | Date |
|---|---|---|
| 130,952 | Sprogle | Aug. 27, 1872 |
| 461,888 | Richardson | Oct. 27, 1891 |
| 935,616 | Todd | Sept. 28, 1909 |
| 1,299,847 | McCoy | Apr. 8, 1919 |
| 1,431,962 | Kempton | Oct. 17, 1922 |
| 1,559,146 | Andrews | Oct. 27, 1925 |